US009232385B2

(12) United States Patent
Lambert

(10) Patent No.: US 9,232,385 B2
(45) Date of Patent: *Jan. 5, 2016

(54) METHOD AND APPARATUS FOR DISCOVERING A WIRELESS DEVICE IN A WIRELESS NETWORK

(71) Applicant: MARVELL WORLD TRADE LTD., St. Michael (BB)

(72) Inventor: Paul A. Lambert, Mountain View, CA (US)

(73) Assignee: Marvell World Trade Ltd., St. Michael (BB)

(*) Notice: Subject to any disclaimer, the term of this patent is extended or adjusted under 35 U.S.C. 154(b) by 0 days.

This patent is subject to a terminal disclaimer.

(21) Appl. No.: 14/682,808

(22) Filed: Apr. 9, 2015

(65) Prior Publication Data

US 2015/0215765 A1    Jul. 30, 2015

Related U.S. Application Data

(63) Continuation of application No. 13/752,902, filed on Jan. 29, 2013.

(60) Provisional application No. 61/592,121, filed on Jan. 30, 2012.

(51) Int. Cl.
| | | |
|---|---|---|
| *H04W 8/00* | (2009.01) | |
| *H04W 56/00* | (2009.01) | |
| *H04W 28/02* | (2009.01) | |
| *H04W 52/02* | (2009.01) | |
| *H04W 74/08* | (2009.01) | |

(52) U.S. Cl.
CPC .......... *H04W 8/005* (2013.01); *H04W 28/0215* (2013.01); *H04W 28/0221* (2013.01); *H04W 52/0216* (2013.01); *H04W 56/001* (2013.01); *H04W 74/0891* (2013.01)

(58) Field of Classification Search
CPC ........................ H04W 56/001; H04W 74/0891
See application file for complete search history.

(56) References Cited

U.S. PATENT DOCUMENTS 8,509,833 B2      8/2013  Tavildar et al.
8,599,822 B2 *  12/2013  Castagnoli .............. H04L 45/02
                                                           370/238

(Continued)

FOREIGN PATENT DOCUMENTS

| EP | 2 043 400 A2 | 4/2009 |
| EP | 2 043 400 A3 | 4/2009 |
| GB | 2 375 014 A | 10/2002 |

OTHER PUBLICATIONS

International Search Report and Written Opinion issued Jul. 3, 2013 in PCT/US2013/023620.

*Primary Examiner* — Ajay Cattungal

(57) ABSTRACT

A method for synchronizing the discovery of wireless services or applications in a wireless network using a recurring time interval T in which wireless devices within the wireless network can be in one of a predetermined plurality of time states. The method includes selecting a time state from amongst the plurality of time states, performing discovery by a first wireless device supporting a given service or application once during the recurring time interval T at the selected time state, and repeating the above steps in successive ones of the recurring time interval T until all of the predetermined plurality of time states have been selected.

24 Claims, 7 Drawing Sheets

(56) References Cited

U.S. PATENT DOCUMENTS

| | | |
|---|---|---|
| 2003/0016732 A1 | 1/2003 | Miklos et al. |
| 2007/0286136 A1 | 12/2007 | Rittle et al. |
| 2009/0086702 A1* | 4/2009 | Julian .................. H04W 8/005 370/345 |
| 2011/0319114 A1* | 12/2011 | Tavildar ................ H04W 16/14 455/514 |

* cited by examiner

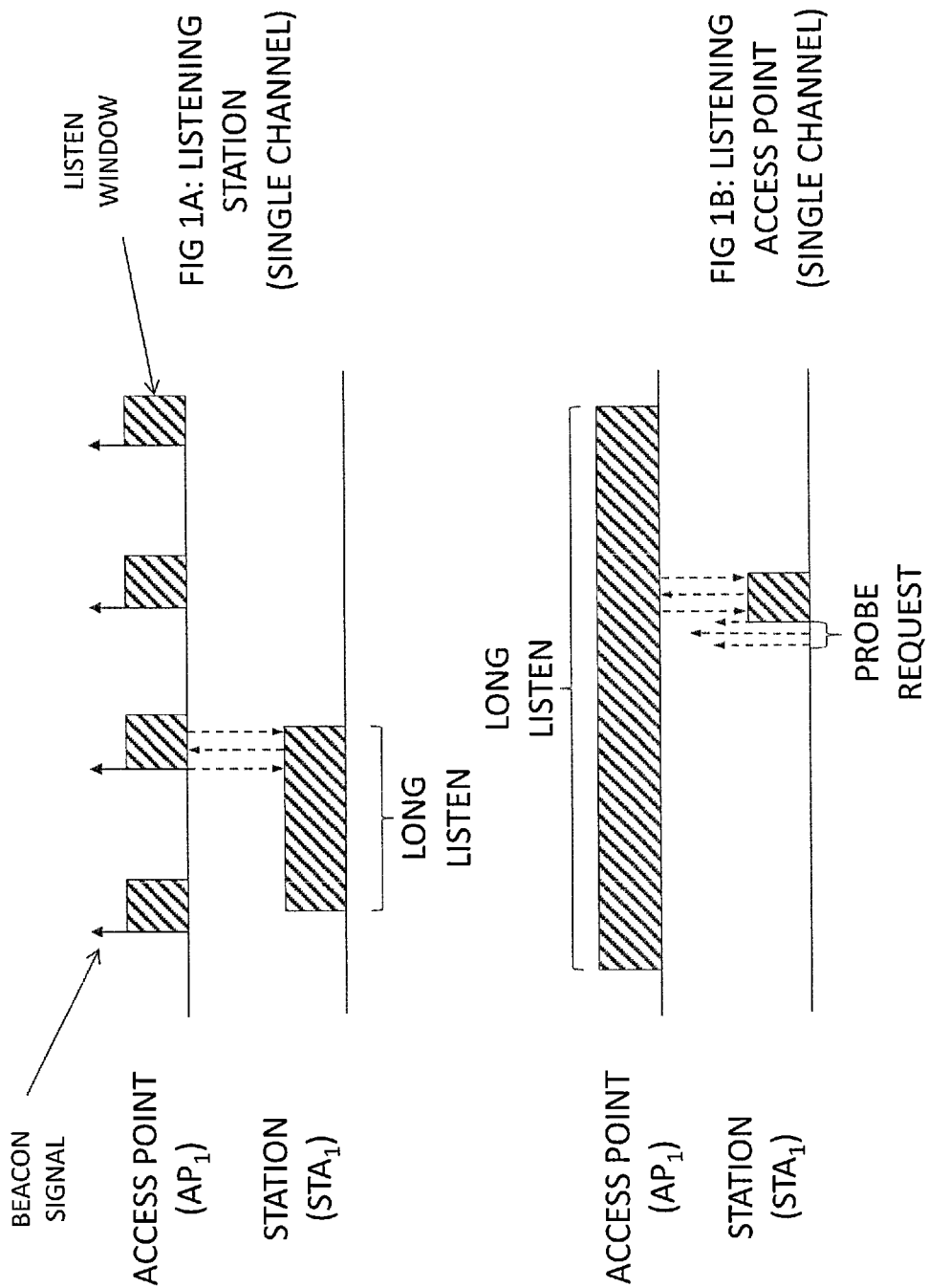

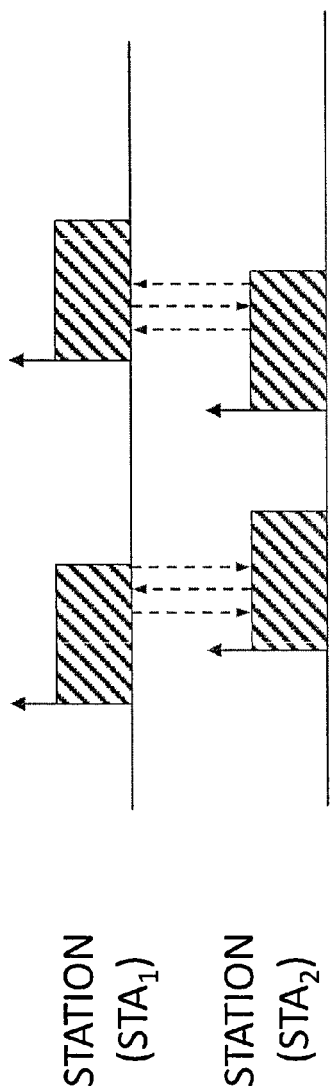

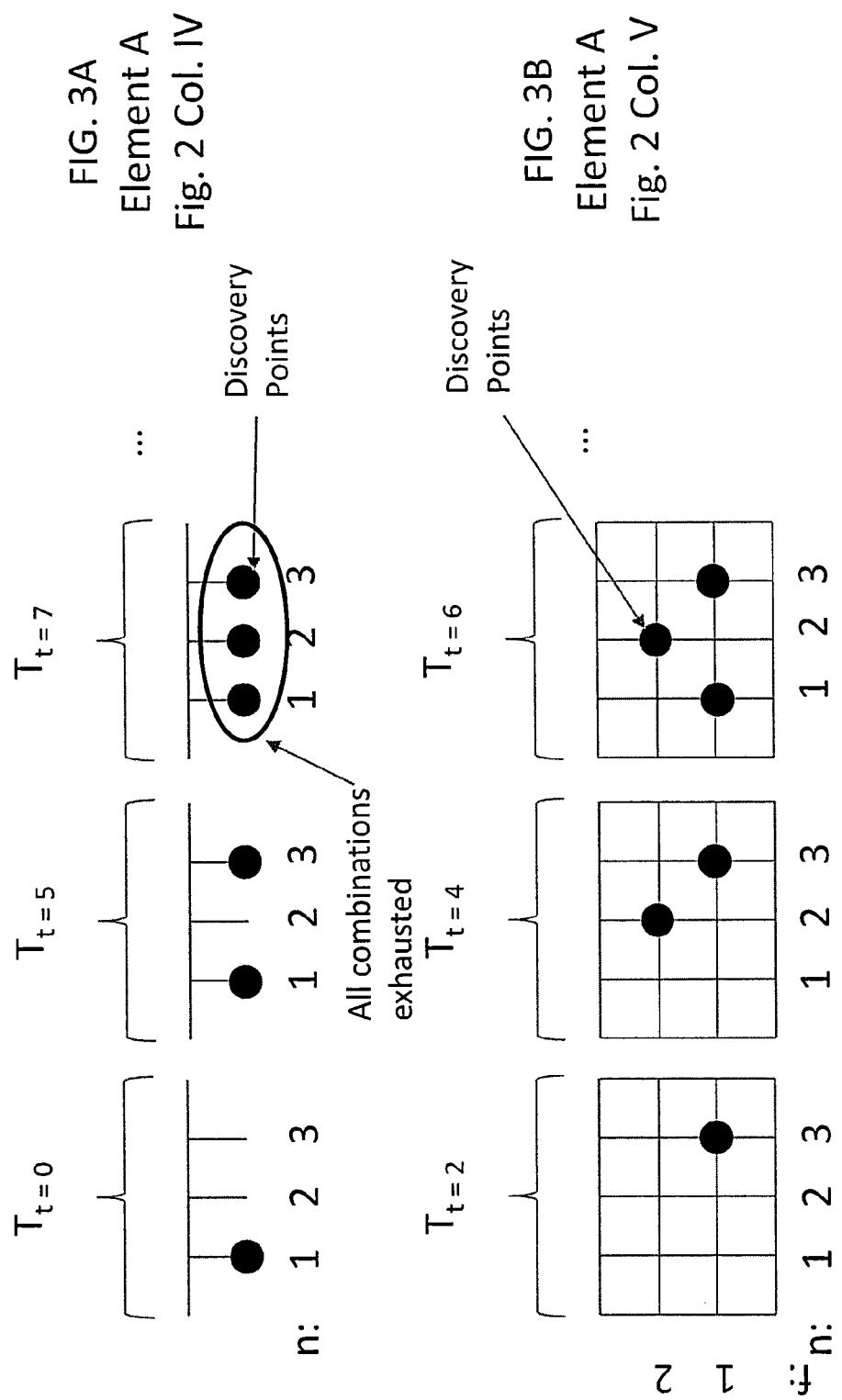

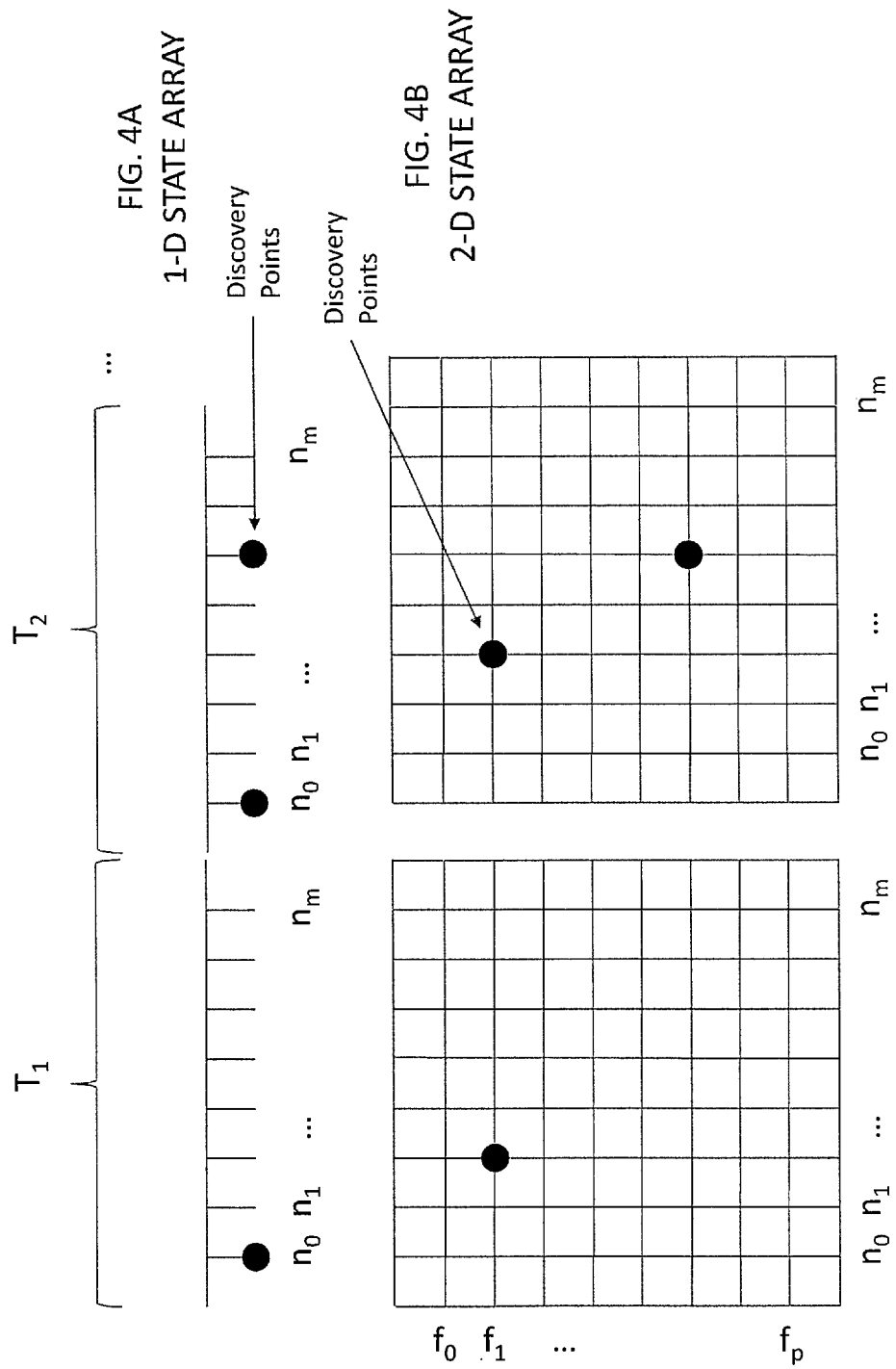

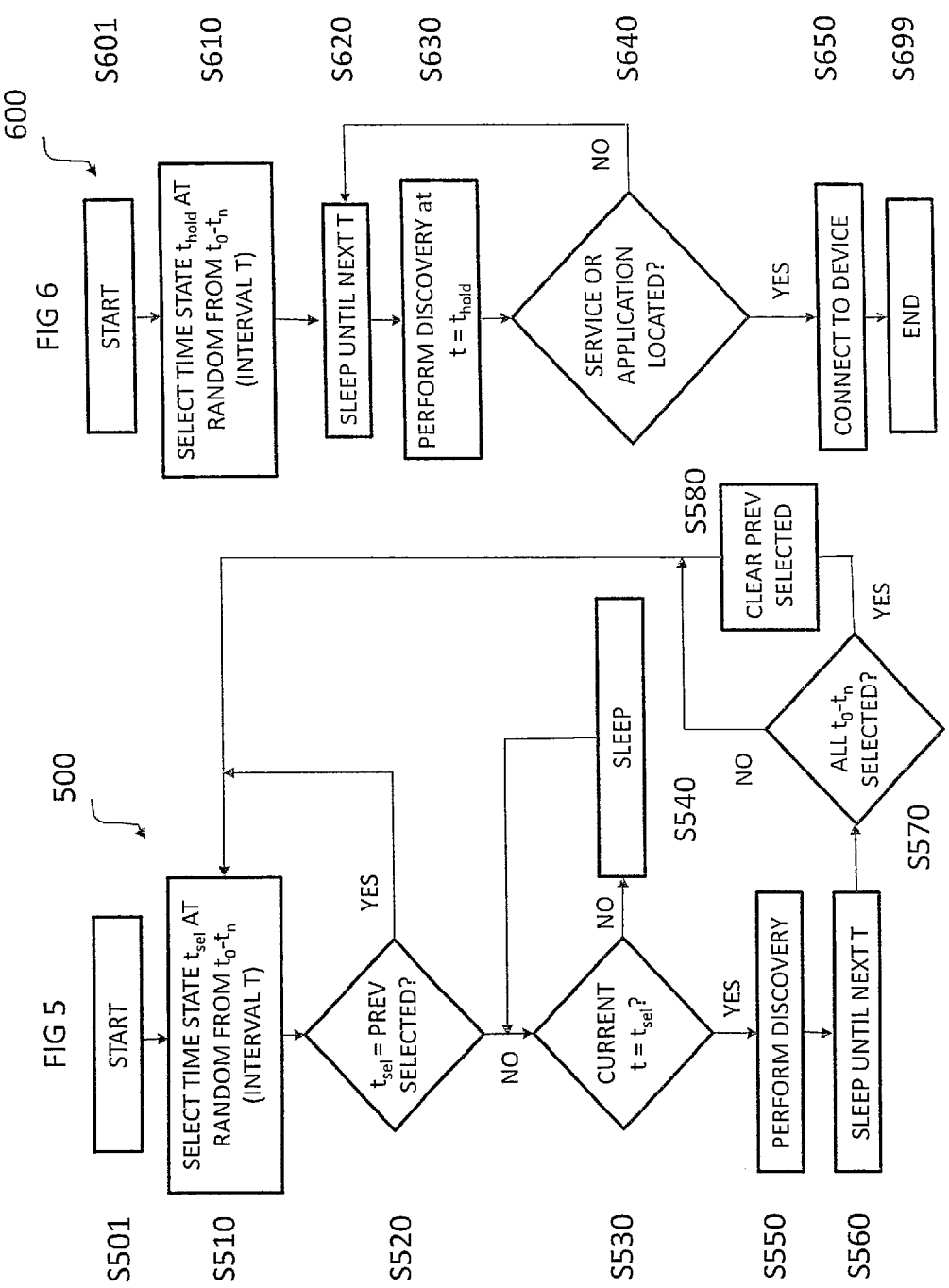

METHOD AND APPARATUS FOR DISCOVERING A WIRELESS DEVICE IN A WIRELESS NETWORK

CROSS-REFERENCE TO RELATED APPLICATION

This application is a continuation of U.S. application Ser. No. 13/752,902, filed on Jan. 29, 2013, which claims the benefit of U.S. Provisional Application Ser. No. 61/592,121, filed on Jan. 30, 2012. The disclosures of the applications above are incorporated herein by reference in their entireties.

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Wireless discovery is the process by which Wi-Fi enabled mobile devices such as cell phones, laptops, tablets and the like (known collectively as "stations") locate and connect with wireless networks and, ultimately, each other. Usually, this entails a wireless device connecting to a wireless access point (AP) such as a router. Increasingly, wireless discovery is also being used to directly connect two or more wireless devices without an intervening access point, in so-called peer-to-peer, P2P or ad-hoc network communication. Wireless discovery may also refer to the process of service re-discovery by one or more devices already connected to the wireless network. In this third scenario, a change in device priority, such as the need to print a document, may drive a wireless device on the network to seek a new connection with a different wireless device (e.g., a print server) also on the network. In any of these circumstances, when a wireless device seeks a new connection, the wireless device may first probe the network and listen for a response to the probe, or the wireless device may listen for a beacon signal to respond to.

Legacy wireless discovery methodology has been to simply keep each wireless device in a state of almost constant discovery (e.g., listening or probing). This approach results in the discovery of new wireless devices almost instantly, but does so at the cost of increased power consumption and overall efficiency. Even worse, the infrastructure makes no restrictions or provisions on when or how many queries/responses may be dispatched, with the result that network congestion may develop very rapidly. This problem is exacerbated in especially crowded areas such as sports/entertainment arenas and urban environments, where a device seeking a new connection may illicit a response from any other wireless device within range, resulting in literally thousands of replies.

SUMMARY

Aspects of this disclosure relate to an efficient wireless discovery process. The techniques described herein potentially provide significant improvements in the prevention of congestion and in power efficiency for an environment consisting of many mobile devices. In this scenario, the devices will typically have no prior association or common configuration. In some embodiments, it is assumed that devices can determine time and initiate synchronous behaviors.

In an embodiment, power constrained devices (like mobile phones or tablet computers) connected to the network (e.g., not in search of a supported application or service) stay in a power reduced state the majority of the time. Based on an internal clock, the devices can wake-up and participate in a discovery process only during select times and at specified frequencies. Thus, during a given time interval T, a given wireless device A may perform wireless discovery at a particular combination such as: (time state, frequency state)=$(t_a, \phi_a)$. The device may then switch to a different combination (referred to herein as a "time state/frequency state hop"), for example, $(t_a, \phi_b)$, $(t_b, \phi_a)$, or $(t_b, \phi_b)$ at a subsequent time interval $T^1$. The device continues choosing different combinations at each subsequent time interval $T^n$ until each (time state, frequency state) combination has been selected at least once without repetition.

In contrast, a wireless device B wishing to make a new connection may choose a single $(t_n, \phi_n)$ combination and hold such combination across a consecutive series of subsequent intervals. Since all combinations are eventually exhausted by device A, device A will eventually discover device B at combination $(t_n, \phi_n)$. Each device not seeking a new connection (e.g., a device already connected to the network and also not performing service or application re-discovery) will similarly exhaust all possible combinations, but in different sequences. In this way, the number of devices connected to the network performing discovery is limited at any given time, resulting in increased power and data efficiency. When device B finds a network partner to sustain the desired new connection, device B effectively joins the network and may begin the time state/frequency state hopping process.

In the above described process, if an already connected device has a change in priority (such as locating a print server), the device may simply switch its state to a seeking-new-connection state (the re-discovery process) and similarly hold on an arbitrary $(t_n, \phi_n)$ combination until the newly prioritized application or service partner is found.

Accordingly, aspects of the disclosure are directed towards a method for synchronizing the discovery of wireless services or applications in a wireless network using a recurring time interval T in which wireless devices within the wireless network can be in one of a predetermined plurality of time states. According to some embodiments, the method includes selecting a time state from amongst the plurality of time states, performing discovery by a first wireless device supporting a given service or application once during the recurring time interval T at the selected time state, and repeating the above steps in successive ones of the recurring time interval T until all of the predetermined plurality of time states have been selected.

According to other aspects of this method, the first wireless device enters or remains in a sleep mode during each time state in which discovery is not performed within each of the recurring time interval T. Still other aspects include the steps of performing discovery by a second wireless device in search of the given service or application once during the recurring time interval T at a second selected time state, and repeating the preceding performing step using the same second selected time state at each successive interval T until the second wireless device has located the given service or application. In some embodiments, the second wireless device is not within the wireless network.

In an embodiment, the wireless network uses a frequency set $\Phi$ having a plurality of frequency states, and the first wireless device performs discovery once during the recurring time interval T at a combination of the selected time state and a selected frequency state, and the first wireless device chooses a different combination of a time state and a frequency state at each successive interval T until all possible combinations of the predetermined plurality of time states and frequency states of frequency set φ have been selected. In another embodiment, the wireless network uses a frequency set φ having a plurality of frequency states, and the second wireless device performs discovery once during the recurring time interval T at a combination of the second selected time state and a frequency state, and the second wireless device chooses a same combination of the second selected time state and the frequency state at each successive interval T until the second wireless device has located the service or application. In one aspect, a combination of a time state and a frequency state is determined at random for each interval T. In another, the combination of the time state and the frequency state is determined at random for the second wireless device.

Some embodiments involve the above noted method wherein the first wireless device is a member of a group having a random seed value, and a combination of a time state and/or a frequency state of the first wireless device is chosen based on the random seed value. In others, random seed values for the members of the group are correlated. In one embodiment, the second wireless device joins a group based on the located service or application. The number of intervals T required to exhaust all possible combinations of a time state and/or a frequency state may be a prime number.

Some aspects also involve making the order of selecting time states from amongst the predetermined plurality of time states random, and in some a selected time state is not re-selected until all other ones of the predetermined plurality of time states have been selected.

BRIEF DESCRIPTION OF THE DRAWINGS

Various embodiments of this disclosure that are provided as examples will be described in detail with reference to the following figures, wherein like numerals reference like devices, and wherein:

FIGS. 1A-1C show diagrams of a service or application discovery process as performed by 1A) a listening station (beacon access point), 1B) a probing station (listening access point), and 1C) an ad-hoc (Peer-to-Peer) configuration according to an embodiment of the disclosure;

FIGS. 3A and 3B illustrate the discovery process according to an exemplary embodiment of the disclosure in 3A) 1-dimensional and 3B) 2-dimensional state diagrams;

FIG. 4 illustrates the discovery process according to an exemplary embodiment of the disclosure of generalized size for 4A) 1-dimensional and 4B) 2-dimensional state diagrams;

FIG. 5 is an exemplary block diagram illustrating a method for performing service or application discovery by a wireless station connected to the network (supporting a particular service or application) according to an exemplary embodiment of the disclosure;

FIG. 6 is an exemplary block diagram illustrating a method for performing service or application discovery by a wireless station not yet connected to the network (in search of a particular service or application) according to an exemplary embodiment of the disclosure.

DETAILED DESCRIPTION

Figure 2:
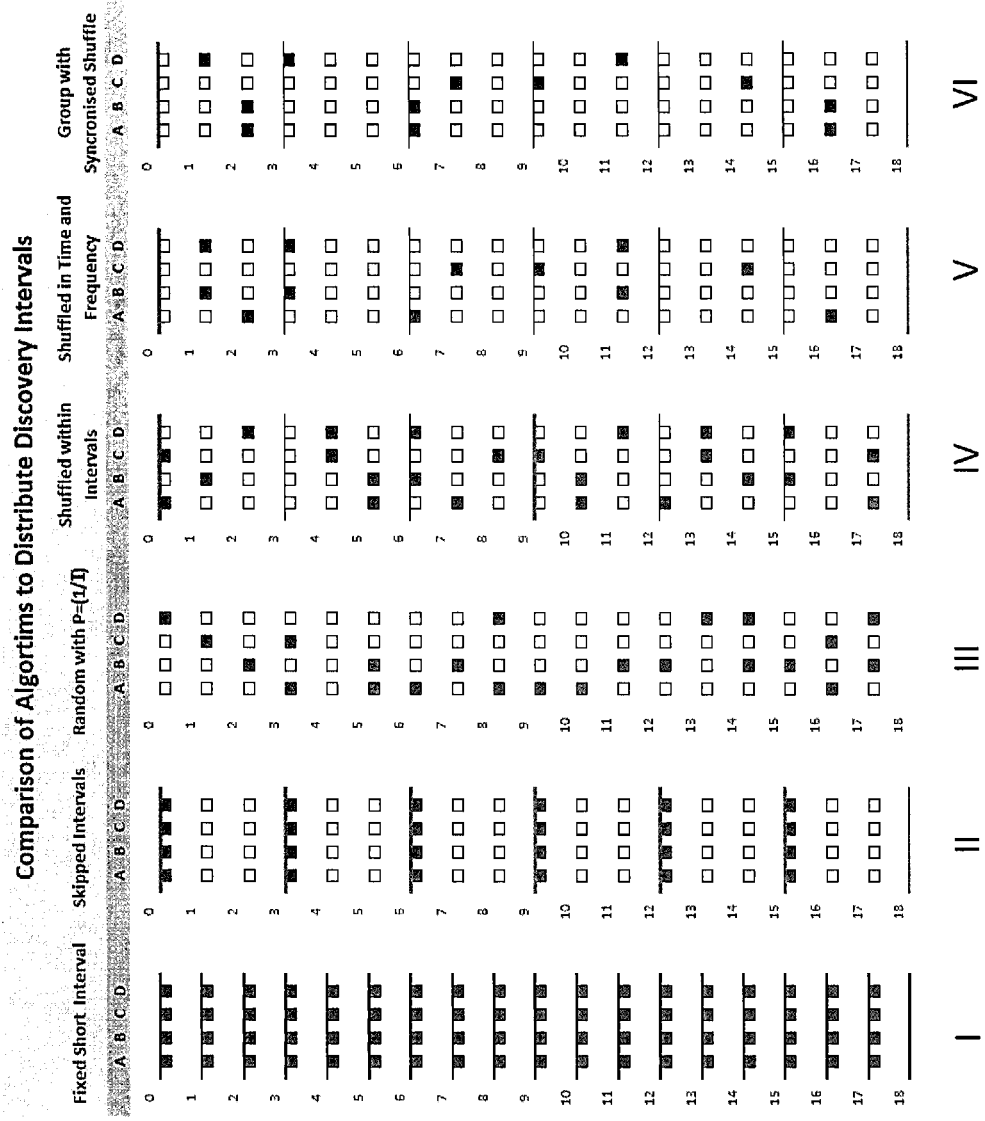
FIG. 2 shows various discovery algorithms according to (Col. I) a legacy method, (Col. II-III) disclosed alternatives, and (Col. IV-VI) exemplary embodiments of the disclosure.

The disclosure is described in detail with reference to the following drawings and description. The components in the figures are not necessarily to scale, emphasis instead being placed upon illustrating principles of the invention. Moreover, in the figures, like reference numerals designate similar corresponding parts or devices throughout the different views.

In this disclosure, a network is established when as few as 2 peer stations have established a connection with each other. In this circumstance, one station would have been the station "supporting" a given service or application, and the other station would have been "in search" of this service or application. Since multiple stations may be in search of a common service, such as an internet gateway, the situation frequently exists where many stations are attempting to connect with a sole, service supporting station. In this case, it sometimes makes more sense to consider the service supporting station as being "connected to the network," and the service seeking station as being "not (yet) connected to the network" during the discovery process. Since both of these terms have independent utility in describing the identical situation, either may be used to express the same situation throughout the disclosure.

Current wireless mechanisms for discovering near-by wireless devices are typically based on listening for some form of beacon or announcement message as depicted in FIG. 1A, by active probing as illustrated in FIG. 1B, or by a combination of both in an ad-hoc configuration as depicted in FIG. 1C.

As illustrated in FIG. 1A, beacons in 802.11 are sent at short regular intervals (e.g., once every 20 ms-1000 ms). Wireless discovery by this method requires one of the devices (in FIG. 1A, the access point $AP_1$) to be continually sending this announcement message and listening for responses. The beacon interval is typically fairly short to allow devices listening for this message to find the beacon signal in a relatively short time. It is not possible to extend this period significantly without requiring the devices listening for the beacon to also extend the time the devices must stay active on the channel (listening).

As illustrated in FIG. 1B, devices that use an active request/response discovery (like 802.11 probe request/response) send out a request, and appropriate peers (in FIG. 1B, access point $AP_1$ again) respond to the request. This class of mechanism requires the listening device to always be on and listening.

FIG. 1C illustrates a generic peer-to-peer wireless discovery scheme between autonomous stations combining devices of both probe and listening schemes.

FIG. 2 illustrates the various wireless discovery schemes further described below. In each column I-VI, each wireless device A-D may perform wireless discovery at any of the time states 0-18, where time in each column proceeds from top-to-bottom. Each of the wireless devices A-D supports a given service or application; i.e. is considered connected to the network and not seeking a new connection.

For example, FIG. 2 Col. I illustrates any of the wireless mechanisms described in FIGS. 1A-1C (listening station, listening access point, or ad-hoc) without any further logical scheduling. As shown in FIG. 2 Col I., each of the four wireless devices A-D performs wireless discovery at each time state 0-18 without omission. Thus, each box A-D, 0-18 is shaded, representing perpetual discovery activity by each device at each interval of time.

The reason for this inefficiency is due to legacy infrastructure policies, which are primarily concerned with connecting wireless devices with other wireless devices as quickly as possible, at the expense of power and messaging efficiency. Thus, if a new device E attempted to join, or an existing device (say, C) sought a new connection, the request would be nearly instantaneously honored. This strategy made for impressive network performance when wireless networks were sparse and relatively un-populated, but results in terrible inefficiency and network congestion when scaled to the large, overlapping, crowded networks that are commonplace today.

One possible solution to reduce the average amount of messages exchanged is to simply increase the intervals of time between beacons or probes. This situation is still depicted in FIG. 2 Col. I, but now the same amount of activity is contained in time states 0-18 of slightly longer duration. While this approach results in reduced message congestion on average by lowering the amount of query/response cycles per minute, it is still power inefficient, since the listening devices are simply listening for longer periods of time. Even worse, although each device is transmitting messages less frequently, there is no reduction to the total number of messages exchanged when the query/response cycle occurs.

A second solution may be to perform wireless discovery exactly as described above, but rather than increasing the interval time between beacons/probes, instead turn everything "off" (e.g., the wireless device enters a sleep mode) for some number of time states following the discovery time state. This is the situation illustrated in FIG. 2 Col. II, which illustrates three possible time states (n=3) over a given interval T, denoted by the solid line. Now, we have reduced the number of messages on average (as above), and we have created a more power efficient solution (since each device is not simply "on" for longer). However, the total number of messages exchanged at t=0, 3, 6 . . . still suffers from the congestion problem, since there is no limit to the number of messages exchanged at these time states.

A third solution is depicted in FIG. 2 Col. III. In this solution, each device A-D has a certain probability $P_d$ (in Col. III, $P_d$=⅓) of turning on to perform wireless discovery in any given time state. This solves all of the problems discussed thus far: the stations spend most of their time in the "off" state, which conserves power, and at any given time the number of messages exchanged is limited to only the stations that are "on."

However, new problems are introduced by this approach. The biggest problem may be that stations are performing discovery at random, meaning there is no uniformity as to when a given station performs discovery, and no guarantee that discovery will occur within a specified time period. Relatedly, there is nothing to prohibit stations from performing discovery inefficiently; i.e., multiple times in a row or just closely spaced in time.

A fourth solution according to an embodiment of the disclosure is illustrated in FIG. 2, Col. IV and in FIG. 3A and FIG. 4A. In this solution, further described below, a time interval T is determined that consists of n discrete time states. T is denoted by either the thick or thin solid line at t=0, 3, 6 . . . . For a given device A, only a finite number of combinations (n) is possible. Thus at a time nT, all of the possible combinations for device A will have been exhausted, assuming no states were repeated or omitted. This situation is illustrated exclusively by the solid lines, which are spaced nT=3T apart as we would expect for n=3.

For example, in FIG. 2 Col. IV and FIG. 3A, T is determined to consist of 3 time states (n=1, 2, or 3). T elapsed is denoted by the solid line above time states t=3, 6, 9 . . . etc. Each wireless device performs wireless discovery exactly once during each T, and may go into a standby or sleep mode during the other time states. The time state that the device chooses, i.e., n=1, 2, or 3, may be random, except that a device may not repeat wireless discovery in a subsequent T at the same state as was previously chosen until all possible states have been exhausted. This process is also referred to as "shuffling," since this is the "shuffling" process used by CD players to play all tracks on a disc not necessarily in order (except by coincidence) without repeating or omitting any tracks.

Thus, at the beginning of the first interval T in FIG. 2 Col. IV and FIG. 3A, device A may choose n=1, 2, or 3 with equal probability. Device A arbitrarily chooses n=1 at time t=0 for the first T interval (0≤t≤2). During the next T interval (3≤t≤5), device A is now restricted to choosing only n=2 or 3, and arbitrarily chooses n=3 at time t=5. During the third interval T (6≤t≤8), device A does not have a choice; it must now choose the only remaining state, n=2 at time t=7. The same goes for devices B-D.

At the end of the third interval T, each possible state has been chosen by each device A-D once. In Col. IV, this was (arbitrarily) as follows: A→(1, 3, 2), B→(2, 3, 1), C→(1, 2, 3) and D→(3, 2, 1). As previously described, this is the significance of the time interval nT=3T; it is the time at which each device has chosen all possible states once and thus begins the process anew.

In the above description, only devices already connected to the network and not seeking new connections were considered. That is, nothing has actually requested a new connection yet. If a hypothetical device E now wishes to join the network, it need only choose a time state, say n=2, and hold this time state across all 3 intervals of T to be assured that each connected network device A-D will have performed discovery on it by the end of time t=3T=9. The selection of a time state by device E may also be at random, or may come from an internally stored or wirelessly detected parameter or value to minimize the device's search time. Likewise, if an existing device, say C, requests a new connection (say, for a different service that has suddenly become a priority), it need only select a fixed value of n to be guaranteed that devices A, B and D will have each performed discovery by time t=3T=9.

A further desirable property to impart on the above described solution is to make n a medium-sized prime number (such as 17). Such numbers are well known in the art to statistically result in fewer undesirable collisions, because other ambient sequences will only exactly overlap at 1, the prime number itself, and multiples thereof. (i.e., n=100 may collide with other ambient sequences of period 1, 2, 5, 10, 20, 25, 50 and 100, whereas n=97 overlaps only with periods 1, 97, and multiples of 97 which are unlikely to occur.)

A fifth and yet more robust solution is depicted in FIG. 2 Col. V and in FIG. 3B and FIG. 4B. In this solution, a second dimension, frequency, is added to the possible state combinations. A first frequency is denoted by a dark shaded box, whereas a second frequency different from the first frequency is denoted as a more lightly shaded box in FIG. 2 Col. V and VI. Now, device A may choose a given time state twice (for example, n=1 at t=6, darkly shaded, and n=1 at t=9, lightly shaded) as long as it acquires one, then the other of the two possible frequency states while in the same time state. By extension, for larger ensembles of frequency states a station may occupy a given time state so long as it continually acquires non-repeating frequency state values at each subsequent interval T. Mathematically, the addition of a second dimension (frequency or otherwise) increases the number of state-space and thus possible combinations, with the result that larger numbers of users may be accommodated. As illustrated in FIG. 4B, the state diagram is now in general a 2-D state array (note that FIG. 2 Col. V only reflects 2 frequency values $f_p$ and 4 time state values $n_m$.)

By making the second dimension frequency, we can go even further and may choose to add combinations of states in various creative ways not available to time alone. For example, we may choose to add more than 2 dimensions (n, f, φ, θ, . . . ), or, depending on our choice of processing, may simply add more 2-D state space (n, $f_0$-$f_{10000}$). This is because, with the addition of frequency, a single frequency "state" may actually consist of (1) frequency hopping between two (or more) frequency values at predetermined times, (2) modulating a single frequency signal in more than one way, or (3) using many multiply distinct static frequencies. For example, one implementation could use 8 distinct frequency values to expand the 2-D state space to (n, $f_0$-$f_7$). However, a different implementation could treat each of the 8 frequencies as a 3-bit binary string (000 through 111), and add a new 8-bit dimension with the concatenated addition of each new frequency "hop". By concatenating bit strings and establishing processing rules (e.g., 5 dimensions with 32-bits per dimension) there is no limit to added dimensions or dimensional state space, and thus to how devices may be accommodated by the disclosed method. However, at some point time may become a consideration, as a device requesting a new connection must still wait until the appropriate application/service supporting station performs discovery on its particular requesting state.

In deciding on specific modulation schemes and frequency sets for adding state-space combinations to a given network, an added consideration may be to keep the total number of iterations T equal to pT where p is a medium-sized prime number for the reasons described above.

A sixth solution, incorporating every device from the previous solution, adds the establishment of groups to the algorithm. Groups may be assembled and coordinated based on any commonly held property or trait of the group's constituent members, or may be formed by any otherwise suitable organizational parameter or algorithm that suits a need or goal of the network. As the addition of the frequency dimension offered an unparalleled addition to the combination space available, the addition of groups offers an unparalleled efficiency tool. The reason is because groups may be constructed to further divide and optimize distinct combinations of users, and may be further combined with exterior processing parameters in different goal-oriented algorithms (minimize collective power, minimize average messages exchanged . . . etc.). Groups may also be used in conjunction with predetermined seed values based on known services or applications, such that new connection requests from existing group members are coordinated to minimize the amount of waiting time until estimated group discovery. FIG. 2 Col. VI shows a sample time slice with devices A,B and devices C,D forming two separate groups.

One implementation of groups may be as follows: it is observed that users preferentially use text messaging or instant messaging, but rarely a combination of each. A text messaging group, Group X, is formed, and each group member is allotted a different random but closely spaced seed value. Accordingly, the members of Group X tend to choose their "random" state space combinations (n, f) very close together, forming a state space 'cluster'. The same is done for the instant messaging group, which is Group Y, but its closely spaced random seed values are well spaced from Group X's. Now, rather than having the two largest groups of the network (Group X and Group Y) performing discovery at the same times, or even near the same times, it can be assured that their discovery clusters do not overlap by a judicious choice of respective seed values and randomization algorithms. Thus, the network needs only to be able to support a single group of users performing discovery at any given time. If a new wireless device Q seeking a new connection supporting text messaging discovers a member P of Group X, Q may connect directly with P, and/or may join Group X based on this commonly held/shared service.

One variation of the above described group algorithm may be to assign exact, identical (as opposed to closely spaced) seed values to each group member. This approach may be preferable for synchronizing the activities of numerous smaller groups, or for keeping group activity synchronized for longer periods of time.

A further implementation may be to form groups spontaneously based on applications being run by the users. In this circumstance, a group may be spontaneously formed consisting of users running a certain (otherwise rare) medical application. (Such a circumstance may arise, for instance at a hotel hosting a convention.) Groups thus provide a layer of adaptability to wireless networks, allowing discovery properties to be dynamically modified in response to an ever-changing user population.

FIG. 5 is a flowchart outlining an exemplary service or application discovery process 500 for a wireless station supporting a given service or application (i.e., connected to the network). The process begins at step 501 and proceeds to step 510, where a time state $t_{sel}$ is selected at random from a plurality of time states $t_0$-$t_n$ that make up time interval T. Control then proceeds to step 520, where it is determined whether this state has been previously selected before all possible states have been exhausted. If it has, control returns to S510 to select a new $t_{sel}$. If not, control proceeds to step S530. (Of course, one possible alternative configuration could be to cancel each time state from a pool of available time states after it has been selected, obviating the need to check if it has been previously selected.)

In step S530, it is determined if $t_{sel}$ corresponds to the current time state. If it does not, the wireless station enters a sleep mode (S540) until it does. When and the current time state coincide, discovery is performed by the station at step S550. Control then flows to step S560, where the station resumes sleep mode until the beginning of the next time interval T. At step S570, it is determined whether the process has culminated in all possible time states having been selected. If it has, the control flows to state S580, where the "previously selected" state pool is re-initialized (or cleared), so that the wireless device may now initially choose any time state again. If it has not, the flow simply resumes at step S510.

FIG. 6 is a flowchart outlining an exemplary service or application discovery process 600 for a wireless station seeking a given service or application (e.g., not connected to the network). The process begins at step 601 and proceeds to step 610, where a time state $t_{hold}$ is selected at random from a plurality of time states $t_0$-$t_n$ comprising time interval T. Control then proceeds to step 620, where the station sleeps until the beginning of the next time interval T. At step 630, the station performs the discovery process. Control flows between steps S640, S620, and S630 while the station continues to perform the discovery process at the time state $t_{hold}$ for each successive time interval T until a desired service or application is located. Once this has occurred, the wireless station connects to the supporting device in step S650, and the process ends at step S699.

Figure 7:
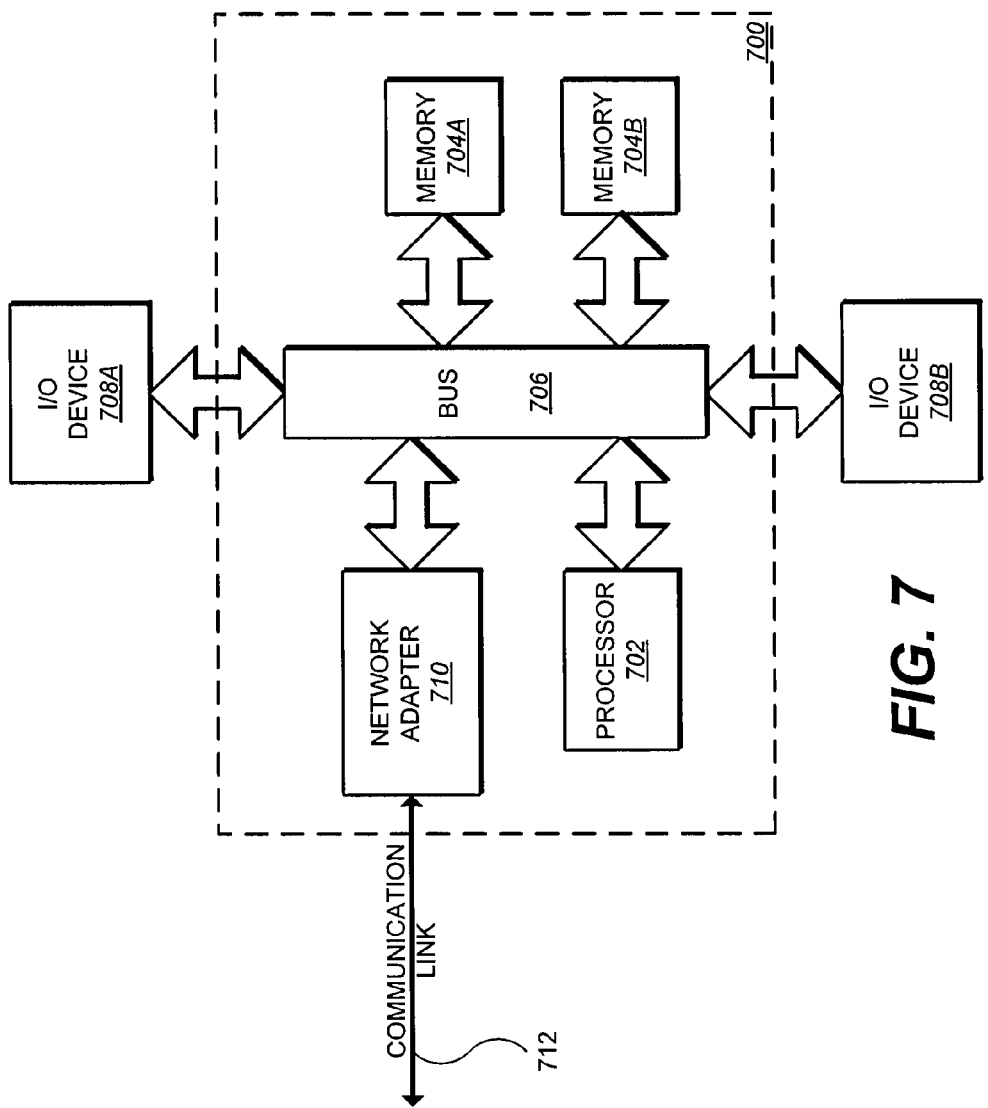
FIG. 7 is an exemplary block diagram of a device suitable for storing and/or executing program code in accordance with one implementation of the invention.

FIG. 7 illustrates one embodiment of a device 700 suitable for storing and/or executing program code to perform one or more processes described above. The wireless device 700 can be a wireless access point and/or a wireless station in various embodiments. The device 700 includes a processor 702 coupled to memory elements 704A-B through a system bus 706. In other implementations, the device 700 may include more than one processor and each processor may be coupled directly or indirectly to one or more memory elements through a system bus. The memory elements 704A-B can include local memory employed during actual execution of the program code, bulk storage, and cache memories that provide temporary storage of at least some program code in order to reduce the number of times the code must be retrieved from bulk storage during execution. As shown, input/output or I/O devices 708A-B (including, but not limited to, keyboards, displays, pointing devices, etc.) are coupled to the device 700. I/O devices 708A-B may be coupled to the device 700 directly or indirectly through intervening I/O controllers (not shown).

In one implementation, a network adapter 710 is coupled to the device 700 to enable the device 700 to become coupled to other data processing systems or remote printers or storage devices through a communication link 712. The communication link 712 can be a private or public network, wireless or wired. Wireless modems, cable modems, and Ethernet cards are just a few of the currently available types of network adapters.

While aspects of the present disclosure have been described in conjunction with the specific embodiments thereof that are provided as examples, alternatives, modifications, and variations to the examples may be made. For example, one or more steps of processes described above can be performed in a different order and/or concurrently and still achieve desirable results. Accordingly, embodiments as set forth herein are intended to be illustrative and not limiting. There are changes that may be made without departing from the scope of the claims set forth below.

What is claimed is:

1. An apparatus for synchronizing discovery of wireless services or applications in a wireless network during a recurring time interval T in which wireless nodes within the wireless network can be active in one of a predetermined plurality of time states, the apparatus comprising circuitry configured to
    (i) select a time state from the plurality of time states;
    (ii) perform discovery once during the recurring time interval T at the selected time state; and
    repeat the above operations (i), (ii) in successive ones of the recurring time interval T until all of the predetermined plurality of time states have been selected exactly once within the successive ones of the recurring time interval T by the apparatus and each of the wireless nodes.

2. The apparatus of claim 1, wherein the apparatus enters or remains in a sleep mode during each time state in which discovery is not performed within each of the recurring time interval T.

3. The apparatus of claim 2, wherein a second wireless node outside the wireless network searches for a given service or application, once during the recurring time interval T at a second selected time state.

4. The apparatus of claim 3, wherein the second wireless node repeats the search using the second selected time state at each successive interval T until the second wireless node has located the given service or application.

5. The apparatus of claim 4, wherein the second wireless node joins a group based on the located service or application.

6. The apparatus of claim 1, wherein an order of selecting time states from the predetermined plurality of time states is random.

7. The apparatus of claim 1, wherein a selected time state is not re-selected by the apparatus until all other ones of the predetermined plurality of time states have been selected by the apparatus within the successive ones of the recurring time interval T.

8. The apparatus of claim 1, wherein the predetermined plurality of time states are predetermined plurality of time slots.

9. A method for synchronizing discovery of wireless services or applications in a wireless network during a recurring time interval T in which wireless nodes within the wireless network can be active in one of a predetermined plurality of states, each state defined by a combination of a time and a frequency, the method comprising:
    (i) selecting a state from the plurality of states;
    (ii) performing discovery, by a first wireless node supporting a given service or application, during the recurring time interval T at the selected state; and
    repeating the above steps (i), (ii) in successive ones of the recurring time interval T until each of the wireless nodes has selected an equal number of states, wherein none of the wireless nodes ever selects a same state more than once within the successive ones of the recurring time interval.

10. The method of claim 9, wherein:
    the first wireless node enters or remains in a sleep mode during each state in which discovery is not performed within each of the recurring time interval T.

11. The method of claim 9, wherein:
    the wireless network uses a plurality of frequencies,
    the first wireless node performs discovery once during the recurring time interval T at a state defined by a combination of a time and a frequency selected from the plurality of frequencies, and
    the first wireless node chooses a different combination of a time and a frequency at each successive interval T until all possible combinations of a time and a frequency have been selected.

12. The method of claim 11, wherein a combination of a time and a frequency is determined at random for each time interval T.

13. The method of claim 12, wherein a number of time interval T required to exhaust all possible combinations of a time and a frequency is a prime number.

14. The method of claim 11, wherein
    the first wireless node is a member of a group having a random seed value; and
    a combination of a time and a frequency of the first wireless node is chosen based on the random seed value.

15. The method of claim 14, wherein random seed values for members of the group are correlated.

16. The method of claim 10, further comprising:
    (iii) performing discovery, by a second wireless node in search of the given service or application, once during the recurring time interval T at a second selected state; and
    repeating the step (iii) using the second selected state at each successive time interval T until the second wireless node has located the given service or application.

17. The method of claim 16, wherein the second wireless node is outside the wireless network.

18. The method of claim 16, wherein:
    the wireless network uses a plurality of frequencies,
    the second wireless node performs discovery once during the recurring time interval T at a combination of a time and a frequency selected from the plurality of frequencies, and
    the second wireless node selects the combination at each successive time interval T until the second wireless node has located the service or application.

19. The method of claim 18, wherein the combination of the time and the frequency is determined at random for the second wireless node.

20. The method of claim 18, wherein the second wireless node joins a group based on the located service or application.

21. An apparatus for synchronizing discovery of wireless services or applications in a wireless network during a recurring time interval T in which wireless nodes within the wireless network can be active in one of a predetermined plurality of time states, the apparatus comprising circuitry configured to
- (i) select a state from the plurality of states;
- (ii) perform discovery during the recurring time interval T at the selected state; and
- repeat the above steps (i), (ii) in successive ones of the recurring time interval T until the apparatus and each of the wireless nodes have selected an equal number of states, wherein none of the apparatus and the wireless nodes ever select a same state more than once within the successive ones of the recurring time interval.

22. The apparatus of claim 21, wherein:
the apparatus enters or remains in a sleep mode during each state in which discovery is not performed within each of the recurring time interval T.

23. The apparatus of claim 21, wherein:
the wireless network uses a plurality of frequencies,
the apparatus performs discovery once during the recurring time interval T at a state defined by a combination of a time and a frequency selected from the plurality of frequencies, and
the first wireless node chooses a different combination of a time and a frequency at each successive interval T until all possible combinations of a time and a frequency have been selected.

24. The apparatus of claim 23, wherein a combination of a time and a frequency is determined at random for each time interval T.

* * * * *